No. 616,808. Patented Dec. 27, 1898.
J. J. RICKETTS.
TUBE JOINT.
(Application filed Aug. 5, 1898.)
(No Model.)
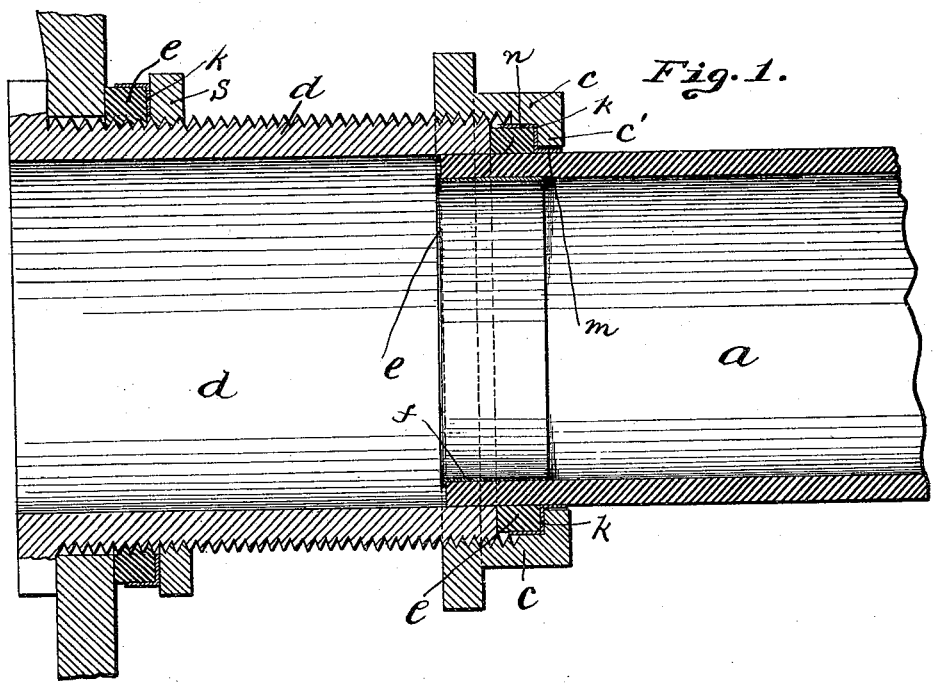
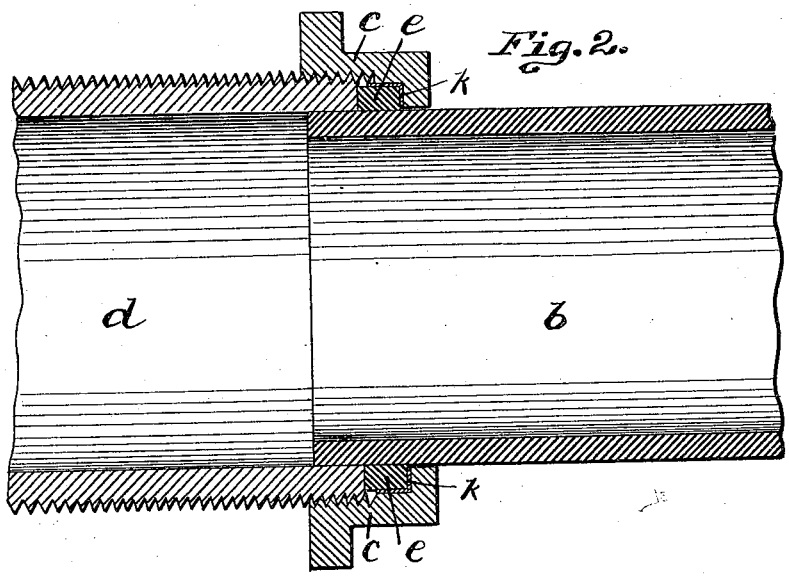
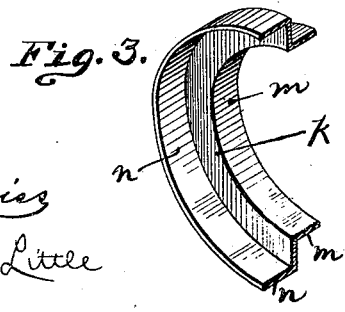
Witnesses:
Inventor:
James J. Ricketts
By Kay & Totten
Attorneys
THE NORRIS PETERS CO., PHOTO-LITHO., WASHINGTON, D. C.

UNITED STATES PATENT OFFICE.

JAMES J. RICKETTS, OF PITTSBURG, PENNSYLVANIA.

TUBE-JOINT.

SPECIFICATION forming part of Letters Patent No. 616,808, dated December 27, 1898.

Application filed August 5, 1898. Serial No. 687,811. (No model.)

*To all whom it may concern:*

Be it known that I, JAMES J. RICKETTS, a resident of Pittsburg, in the county of Allegheny and State of Pennsylvania, have invented a new and useful Improvement in Tube-Joints; and I do hereby declare the following to be a full, clear, and exact description thereof.

My invention relates to tube-joints, its special object being to provide a form of joint suitable for making connections between water-closets and like earthenware bodies and pipes by means of rubber or like flexible tubes, such as elbows and like shapes, which are used at the present time for this purpose. It may also be employed to advantage in connection with joints for metallic pipes. Its object is to provide a joint which is adjustable longitudinally without the necessity of any special shaping of the tube for the purpose and at the same time to provide a joint which is not liable to pull out under any ordinary strains to which it may be subjected.

It consists, generally stated, in combining with the tube and with a nut thereon to connect onto the spud of the closet or other threaded joint to which connection is to be made a separate rubber or like washer thereon and an outside ring between the nut and the washer having a lip extending over the washer and confining its outward expansion when under compression, such as where the rubber washer is pressed against the tube to which connection is to be made, the washer when so compressed being confined by the lip extending over it, so that its expansion must be downward against the tube, and the washer being forced in this way into such strong frictional contact with the tube that it requires more than the strain to which the joint would ordinarily be subjected to draw the tube through the washer. It also comprises the same joint used in connection with a rubber or like flexible tube around which the rubber washer fits and is confined by the ring, while an inside non-collapsible tube holds the rubber tube to position.

To enable others skilled in the art to make and use my invention, I will describe the same more fully, referring to the accompanying drawings, in which—

Figure 1 is a sectional view of a connection with a rubber or like flexible tube, showing the position of the parts when the joint is made. Fig. 2 is a like view where the joint is employed with a metallic tube, and Fig. 3 is a sectional perspective of the confining outside ring, showing its construction.

Like letters of reference indicate like parts in each view.

My invention is more particularly intended to be used with a rubber or like flexible tube to be connected to a water-closet and will be particularly described in connection with the same, though it is to be understood that it is applicable to any kind of tubing to form an adjustable joint therefor.

In the drawings in Fig. 1, $a$ represents a portion of an ordinary "rubber elbow," as it is termed, for water-closet connections, and $b$, Fig. 2, represents a straight metallic tube, which may be employed in any suitable way where tube-joints are desired.

The letter $c$ is the ordinary nut usually employed for making connections, which screws onto the spud or threaded tube $d$, which can be connected in any suitable way to the water-closet horn or like part.

It will be seen that the part of the rubber tube $a$ at which the joint is to be formed has no enlargement, being plain surfaced, and that in order to provide the necessary packing-body I place around the same a separate rubber or like flexible washer $e$, which is of such size as to fit closely onto the rubber body of the tube. In order to prevent the tube from collapsing at the point where the joint is to be made, I employ a non-collapsible inside tube $f$, which can well be made of brass and which braces that part of the tube, so as to make a proper joint. Fitting around the tube $a$ and back of the washer $e$ is the ring $k$, which fits between the nut $c$ and the washer $e$, it being preferred that the ring shall have the lip $m$ of proper diameter to fit easily over the tube $a$ and between the inwardly-extending lip $c'$ of the nut and said tube, so as to prevent contact of the nut $c$ with the tube and washer. At the outer edge of the ring $k$ is formed the annular lip $n$, which extends in the opposite direction to the lip $m$ and extends over the washer $e$, confining the same against outward expansion. This lip $n$ is preferably made to fit neatly on the top of the washer, though this is not essential, the only essential being that when the washer is compressed against the spud or other surface with which the joint is to be formed the lip $n$ shall confine the washer against outward expansion, so that the compression of the washer will force it tightly against the tube $a$ and form a strong frictional contact between the same.

When the joint is made, as above described, between a rubber tube and the spud or other like device, such as where the connection is used for water-closets, after the different parts are in position, so that the exact position desired for the rubber tube and spud are fixed, the nut $c$ and ring $k$ are both passed onto the rubber tube, and the washer $e$ is then passed onto the tube into the position desired, and the inner non-collapsible tube $f$ is slipped within the same, so as to brace the tube at the point around which the washer fits. This washer can be located at any desired point along the surface of the tube and the part extending beyond it either to be cut off or permitted to enter into the spud or tube to which connection is to be made, as may be desired. The ring $k$ is then brought up into position and slipped over the washer, as indicated in Fig. 1, and the nut is then passed over the ring $k$, fitting around its lip $m$ and against its body and over its outer lip $n$, and is screwed onto the spud $d$. As the nut is screwed onto the spud the washer $e$ is compressed between the ring $k$ and the end of the spud, and as so compressed it would naturally expand in two directions—outwardly against the ring and inwardly against the tube. The lip $n$ of the ring, however, confines the washer from outward expansion, so that the displacement caused by its compression can only act inwardly against the tube, and in this way it is pressed against the tube with much more force than if the washer were not confined by the outer lip $n$ of the ring, and sufficient frictional contact between the two is obtained to prevent any movement of the tube within the washer, except upon a pulling strain, to which there is no liability of its being subjected when in use, so that a joint is obtained which is fixed as against any ordinary or usual strains. At the same time the advantage of adjustment between the rubber tube and the spud is obtained, and a still further advantage is found in the fact that no portion of the metal nut $c$ contacts with the washer $e$, and therefore that there is no liability of the washer "gumming" to the nut in such way as to prevent the opening of the joint in case it is necessary.

Where the invention is employed with a suitable metallic pipe, as shown in Fig. 2, the construction is the same as that above described, except that there is no necessity for the inner metallic or non-collapsible tube $f$.

The nut $c$ and the ring $k$ are slipped over the tube, and the washer is then placed around it and adjusted to the desired position, the end of the tube inserted within the spud or other tube to which connection is to be made, and the ring $k$ slipped back over the washer and the nut $c$ placed over the ring and screwed onto the spud or tube, and as the nut is screwed onto the tube and the washer is compressed it acts in the same way as above described, the washer obtaining a strong frictional hold upon the tube and, in addition to forming a tight joint, holding the same in fixed position unless under exceptional strain.

As shown in Fig. 1, the invention can be employed to advantage in connecting the spud to the water-closets, bath-tub, or like bowl, the washer $e$ being placed against the bowl, the ring $k$ slipped over the spud and fitting around it, and a nut $s$ screwed against the ring, which as the washer is compressed forces it down firmly into contact with the spud, making a tight joint.

The rings $k$ can be easily and cheaply made, adding practically no expense to the joint, while overcoming the principal objection to joints of this character, where on account of the expansion of the washer in both directions the frictional hold was insufficient to prevent movement of the tube under ordinary strains.

What I claim as my invention, and desire to secure by Letters Patent, is—

1. In combination with a tube to be connected to another tubular body, a nut on the tube, a separate rubber or like washer fitting around said tube and an outside ring between the nut and washer having a lip extending over the washer and adapted to confine it against outward expansion when under compression, substantially as set forth.

2. In combination with a rubber or like flexible tube to be connected to another tubular body, a nut on said flexible tube, a separate rubber or like flexible washer around the tube, an inside non-collapsible tube, and an outside ring between the nut and washer having a lip extending over the washer and adapted to confine it against outward expansion when under compression, substantially as set forth.

3. In combination with a rubber or like flexible tube to be connected to another tubular body, a nut on said flexible tube, a separate rubber or like flexible washer around the tube, an inside non-collapsible tube, and an outside ring between the nut and washer having a lip extending over the washer and adapted to confine it against outward expansion when under compression, said ring having also a lip at its inner edge fitting between the rubber tube and the nut, substantially as set forth.

In testimony whereof I, the said JAMES J. RICKETTS, have hereunto set my hand.

JAMES J. RICKETTS.

Witnesses:
JAS. McLAREN,
LINDSAY DeB. LITTLE.